United States Patent
Goel et al.

(10) Patent No.: US 10,024,591 B2
(45) Date of Patent: Jul. 17, 2018

(54) SENSOR FAILURE ERROR HANDLING

(71) Applicant: Lennox Industries Inc., Richardson, TX (US)

(72) Inventors: Rakesh Goel, Irving, TX (US); Anuradha Sundararajan, Allen, TX (US)

(73) Assignee: Lennox Industries Inc., Richardson, TX (US)

(*) Notice: Subject to any disclaimer, the term of this patent is extended or adjusted under 35 U.S.C. 154(b) by 340 days.

(21) Appl. No.: 14/712,562

(22) Filed: May 14, 2015

(65) Prior Publication Data
US 2015/0330690 A1    Nov. 19, 2015

Related U.S. Application Data

(60) Provisional application No. 61/993,468, filed on May 15, 2014, provisional application No. 61/993,402, filed on May 15, 2014.

(51) Int. Cl.
*F25B 7/00* (2006.01)
*F25B 49/02* (2006.01)
(Continued)

(52) U.S. Cl.
CPC .............. *F25B 49/022* (2013.01); *F25B 7/00* (2013.01); *F25B 49/005* (2013.01); *G05B 15/02* (2013.01);
(Continued)

(58) Field of Classification Search
CPC .... F25B 49/022; F25B 2500/16; F25B 49/02; F25B 49/025; F25B 2700/05;
(Continued)

(56) References Cited

U.S. PATENT DOCUMENTS 4,034,570 A * 7/1977 Anderson ............ F24F 11/0009
62/158
4,448,033 A * 5/1984 Briccetti ............ G05D 23/1917
236/94

(Continued)

OTHER PUBLICATIONS

Rakesh Goel, U.S. Appl. No. 14/712,489, Entitled, "Accomodating CSSH for Tandem Compressor Transitions", filed May 14, 2015, 46 pages.

*Primary Examiner* — Len Tran
*Assistant Examiner* — Kamran Tavakoldavani
(74) *Attorney, Agent, or Firm* — Baker Botts L.L.P.

(57) ABSTRACT

An HVAC system includes a plurality of sensors, a tandem compressor, and a controller. The tandem compressor comprises a first and second compressor, each comprising a crankcase heater. The controller determines that one of the sensors has failed, and in response, initiates the first and second crankcase heaters and transmits an alert indicating that one of the sensors has failed. Further, the controller may disable threshold logic such that the first and second compressors are controlled independently of a determination whether the tandem compressor is operating outside of a threshold range. The controller operates the first and second compressors according to a safe mode, wherein first on or off settings of the compressors are determined based on a first required load operation of the tandem compressor. The first required load operation is determined from a first temperature demand of a structure associated with the HVAC system.

7 Claims, 5 Drawing Sheets

(51) Int. Cl.
  *G05B 15/02* (2006.01)
  *F25B 49/00* (2006.01)
  *F25B 31/00* (2006.01)
  *F24F 110/12* (2018.01)
  *F24F 11/85* (2018.01)

(52) U.S. Cl.
  CPC .......... *F24F 11/85* (2018.01); *F24F 2110/12* (2018.01); *F25B 31/002* (2013.01); *F25B 2400/01* (2013.01); *F25B 2400/075* (2013.01); *F25B 2500/16* (2013.01); *F25B 2500/19* (2013.01); *F25B 2600/01* (2013.01); *F25B 2600/0251* (2013.01); *F25B 2600/112* (2013.01); *F25B 2700/1933* (2013.01); *F25B 2700/2106* (2013.01); *F25B 2700/21155* (2013.01); *Y02B 30/743* (2013.01)

(58) Field of Classification Search
  CPC ........ F25B 2400/075; F25B 2400/0751; F24F 11/006; G05B 15/02
  See application file for complete search history.

(56) References Cited

U.S. PATENT DOCUMENTS

| | | | |
|---|---|---|---|
| 2002/0127120 A1* | 9/2002 | Hahn | F04C 23/008 417/280 |
| 2005/0160761 A1* | 7/2005 | Taras | F25B 1/10 62/510 |
| 2013/0219931 A1* | 8/2013 | Childs | F24F 11/008 62/115 |

* cited by examiner

SENSOR FAILURE ERROR HANDLING

RELATED APPLICATION

This application claims benefit under 35 U.S.C. § 119(e) to U.S. Provisional Application Ser. No. 61/993,468, entitled "SENSOR FAILURE ERROR HANDLING," filed May 15, 2014, the entire content of which is incorporated herein by reference. This application claims benefit under 35 U.S.C. § 119(e) to U.S. Provisional Application Ser. No. 61/993,402, entitled "ACCOMMODATING CSSH FOR TANDEM COMPRESSOR TRANSITIONS," filed May 15, 2014, the entire content of which is incorporated herein by reference.

TECHNICAL FIELD

This disclosure relates generally to heating, ventilation, and air conditioning systems (HVAC) with tandem compressors and, more specifically, a system for handling a sensor failure error.

BACKGROUND

Some HVAC systems are implemented with two or more compressors configured for operation as tandem compressors within a tandem compressor group. Tandem compressors may allow for efficient HVAC system operation over a broad demand range. A tandem compressor HVAC system may respond to changes in load demand by adjusting the number of compressors in operation. For example, to meet a partial demand load, the tandem compressor HVAC system may operate fewer that all of the compressors in the tandem compressor group. To meet a full demand load, the tandem compressor HVAC system may simultaneously operate all of compressors in the tandem compressor group.

SUMMARY

In one embodiment, an HVAC system includes a plurality of sensors, a tandem compressor, and a controller. The tandem compressor comprises a first and second compressor, where the first compressor comprises a first crankcase heater and the second compressor comprises a second crankcase heater. The controller is operable to determine that one of the plurality of sensors has failed. In response to this determination, the controller may initiate the first crankcase heater, initiate the second crankcase heater, and transmit an alert indicating that one of the plurality of sensors has failed. Further in response to determining that one of the plurality of sensors has failed, the controller may disable threshold logic such that the first and second compressors are controlled independently of a determination whether the tandem compressor is operating outside of a threshold range. The controller also operates the first compressor and the second compressor according to a safe mode. When operating according to the safe mode, first on or off settings of the first compressor and the second compressor are determined based on a first required load operation of the tandem compressor. The first required load operation may be determined from a first temperature demand of a structure associated with the HVAC system In one embodiment, a controller for operating an HVAC system comprises a memory and a processor communicatively coupled to the memory. The processor is operable to determine that one of a plurality of sensors associated with the HVAC system has failed. In response to determining that one of the plurality of sensors has failed, the controller initiates a first crankcase heater and a second crankcase heater. The first crankcase heater may be associated with a first compressor of a tandem compressor and the second crankcase heater may be associated with a second compressor of the tandem compressor. Further in response to determining that one of the plurality of sensors has failed, the controller is operable to transmit an alert indicating that one of the plurality of sensors has failed and disable threshold logic. When the threshold logic is disabled, the first and second compressors are controlled independently of a determination whether the tandem compressor is operating outside of a threshold range. Further in response to determining one of the plurality of sensors has failed, the processor operates the first compressor and the second compressor according to a safe mode. In safe mode, the first on or off settings of the first compressor and the second compressor are determined based on a first required load operation of the tandem compressor. The process may determine the first required load operation from a first temperature demand of a structure associated with the HVAC system.

Certain embodiments of the present disclosure may provide one or more technical advantages. For example, if one of the sensors required to determine the compressor sump super heat (CSSH) of compressors of the tandem compressor has failed, then the system may not be able to determine whether the compressors of the tandem compressor may safely operate. By disabling threshold logic, the system prevents operating compressors based on a faulty or incorrect CSSH value. As another example, even though one of the sensors has failed, the system may continue operation and satisfying temperature demand of a structure associated with HVAC system while ensuring compressors operate safely and without risk of failure.

Certain embodiments of the disclosure may include none, some, or all of the above technical advantages. One or more other technical advantages may be readily apparent to one skilled in the art from the figures, descriptions, and claims included herein. Moreover, while specific advantages have been enumerated above, various embodiments may include all, some, or none of the enumerated advantages.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION OF THE DRAWINGS

In tandem compressors, a controller may calculate the compressor sump super heat (CSSH) of each individual compressor within the tandem compressor to determine that it may safely operate. When the CSSH value is outside of a threshold range, the controller may have threshold logic that turns off the compressor(s) with the high CSSH value. This prevents the compressor(s) from operating when it has a CSSH value outside a threshold range, thus preventing any damage to the compressor(s). However, there are some situations where controller may calculate a CSSH value outside of the threshold range, but the compressor may safely operate. In other words, the CSSH value does not accurately indicate a likelihood of damage to the compressor. For example, if there is a failure in one of the sensors that gathers data that the controller uses in the CSSH calculate, then the CSSH value is not an accurate indicator in whether the compressor may safely operate. Similarly, when the HVAC system changes its state by either turning on a number of compressors within the tandem compressor or by changing the speed of an indoor blower, the CSSH value may be outside the threshold range only while the system's state is changing. In these situations, the HVAC system cannot run efficiently because the threshold logic continues to turn off compressors based on the CSSH value even though the CSSH value is not accurate in these situations and the compressors may safely operate.

In these situations, it is helpful to turn off or disable the threshold logic for a limited amount of time such that it will not turn off the compressor(s) with CSSH values outside of the threshold range. By disabling the threshold logic in these scenarios (e.g., where CSSH value is outside the threshold range, but compressors may safely operate), the system can continue to meet any temperature demand of the structure being heated or cooled by the HVAC system without risk of damage to any compressors. By disabling the threshold logic for only a brief period of time, the system benefits from the threshold logic turning off compressors when there is an actual risk of damage to the system, but allows the compressors to operate and meet the temperature demand in the specific scenarios where CSSH values are outside the threshold range but compressors may safely operate.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

Figure 1:
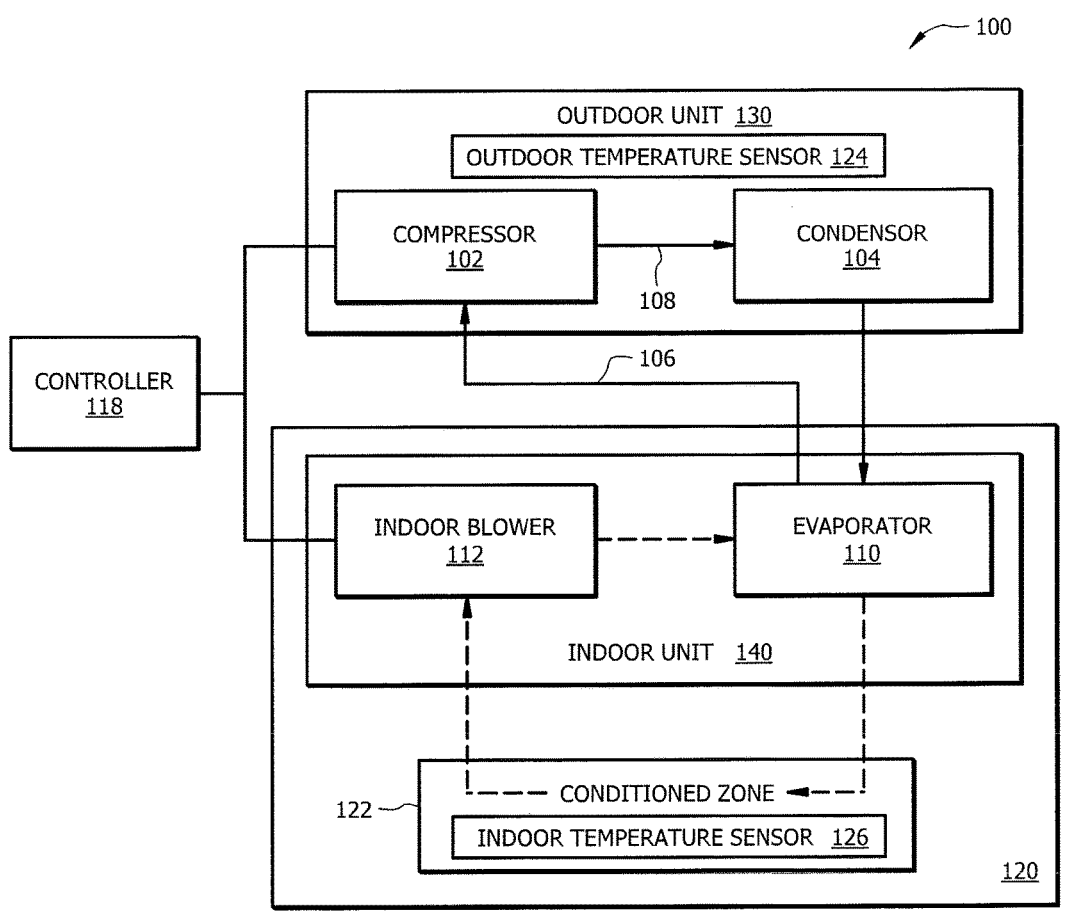
FIG. 1 illustrates a block diagram of an example HVAC system 100 for providing conditioned air to a structure.

FIG. 1 illustrates a block diagram of an example HVAC system 100 for providing conditioned air to a structure. The HVAC system 100 may be configured for use with refrigerant as part of vapor compression cycle operation. The HVAC system 100 may provide heating, ventilation, or cooling supply air to a space. The HVAC system 100 may be used in residential or commercial buildings, and in refrigeration. In an embodiment, the HVAC system 100 may be a heat pump unit, a heating only unit, a cooling only unit, a Variable Refrigerant Flow (VRF) unit, or the like. Additionally, the HVAC system 100 may be a single stage or multi-stage unit.

In certain embodiments, HVAC system 100 comprises outdoor unit 130, controller 118, and structure 120, which contains indoor unit 140 and conditioned zone 122. Outdoor unit 130 may comprise tandem compressor 102, suction line 106, discharge line 108, and outdoor ambient temperature sensor 124. Indoor unit may comprise indoor blower 112 and evaporator 110. Conditioned zone 122 may comprise an indoor temperature sensor 126. In some embodiments, compressor 102 may receive refrigerant from suction line 106 and compress the refrigerant and discharge the refrigerant through discharge line 108. From discharge line 108, the refrigerant may be cooled by condenser 104, flow through a liquid line including an expansion device, and heated by evaporator 110 before returning to suction line 106 to flow through the refrigerant loop again.

In some embodiments, indoor blower 112 may comprise a fan to blow air over evaporator 110 such that air is circulated to conditioned zone 122 of structure 120. In some embodiments, indoor blower 112 may be a variable speed indoor blower, which provides air to evaporator 110 and conditioned zone 122 at multiple speeds. The speed of indoor blower 112 may be expressed in terms of cubic feet per minute (CFM), rotational rate of the blower motor per minute (RPM), or any suitable units. Indoor blower 112 may be communicatively coupled to controller 118 such that controller 118 may receive data regarding the current speed of indoor blower 118 and may transmit signals to change the speed of indoor blower 118.

In some embodiments, outdoor temperature sensor 124 and indoor temperature sensor 126 may be thermistors, thermocouples, resistive temperature devices, infrared sensors, thermometers, or any device configured to sense the temperature of the air surrounding the sensor. In some embodiments, outdoor temperature sensor 124 and indoor temperature sensor 126 may be configured to transmit one or more signals to controller 118 indicating the respective temperature data sensed by outdoor temperature sensor 124 and indoor temperature sensor 126. Outdoor temperature sensor 124 may, in various embodiments, comprise a sensor to measure the temperature outside of structure 120 that HVAC system 100 is heating or cooling. In some embodiments, indoor temperature sensor 124 may comprise a sensor to measure the temperature in conditioned zone 122 of structure 120 that HVAC system 100 is heating or cooling.

Figure 2:
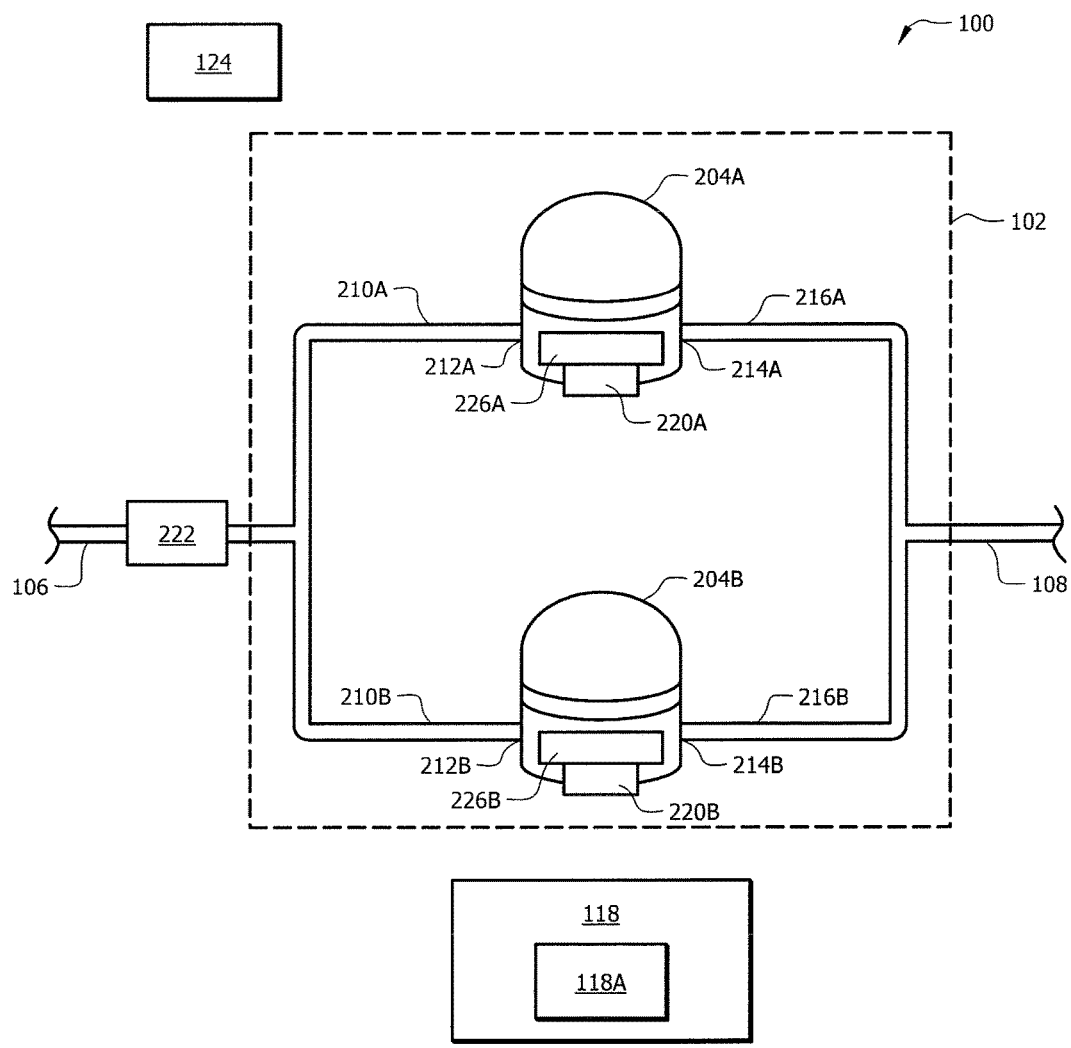
FIG. 2 illustrates a block diagram of an example HVAC system using a tandem compressor.

FIG. 2 illustrates a block diagram of an example HVAC system using a tandem compressor. Compressor 102 may be a tandem compressor, comprising compressor 204A and compressor 204B. Compressors 204A-B may each have their own suction lines 210A-B, suction ports 212A-B, crankcase heaters 226A-B, sump temperature sensors 220A-B, discharge ports 214A-B, and discharge lines 216A-B, respectively. Controller 118 may receive data from one or more sensors, such as sump temperature sensors 220A-B, suction pressure sensor 222, outdoor temperature sensor 124, and indoor temperature sensor 126, and use the received data to control the operation of compressors 204A-B and crankcase heaters 226A-B.

The HVAC system 100 may be configured to operate tandem compressor 102 in response to both full load and partial load demands. According to the embodiment shown, full load demand may require operation of both compressors 204A and 204B while partial load demand may require operation of only one compressor 204A or 204B. Tandem compressor 102 may, in various embodiments, include, suction line 106, discharge line 108, suction pressure sensor 222, and a plurality of compressors 204A-B.

Tandem compressor 102 may, in some embodiments, include suction line 106 to facilitate the movement of refrigerant in HVAC system 100. Suction line 106 may, in various embodiments, be an inlet to tandem compressor 102 that provides the low pressure vapor from an evaporator. HVAC system 100 may have a "merged" piping configuration, whereby both compressors 204A-B are in fluid communication with common piping sections. For example, both compressors 204-B receive refrigerant from suction line 106. In some embodiments, suction line 106 may divide into separate lines, such that each of the compressors 204A-B may receive refrigerant via suction lines 210A-B, respectively. The suction lines 210A-B may couple to compressors 204A-B at suction ports 212A-B, respectively. Thus, HVAC system 100 refrigerant received at suction ports 212A-B may be at substantially the same temperature and pressure.

In some embodiments, tandem compressor 102 may include discharge line 108 to facilitate the movement of refrigerant in HVAC system 100. Discharge line 108 may, in various embodiments, remove high pressure vapor from tandem compressor 102. In some embodiments, the "merged" piping configuration allows both compressors 204A-B to be in fluid communication with discharge line 108. In some embodiments, each compressor 204A-B may be coupled to discharge lines 216A-B at discharge ports 214A-B, respectively. Discharge lines 216A-B may merge into discharge line 108 such that the refrigerant sent to the evaporator may be at substantially the same temperature and pressure.

In some embodiments, suction line 106 may comprise a suction pressure sensor 222. Suction pressure sensor 222 may directly sense, calculate, approximate, or determine from sensed data, the HVAC system 100 refrigerant pressure within the portion of refrigerant piping to which the suction pressure sensor 222 is affixed, for example suction line 106. Suction pressure sensor 222 may be operably connected to controller 118 via wired or wireless connections. Suction pressure sensor 222 may transmit one or more signals comprising sensed pressure data or, alternatively, component status data to controller 118. In an embodiment, suction pressure sensor 222 may transmit analog or pneumatic signals either directly, or indirectly, to controller 118. The signals transmitted by suction pressure sensor 222 may be converted to digital signals prior to use by controller 118. In some embodiments, suction pressure sensor 222 may transmit digital signals to controller 118. The digital signals transmitted by suction pressure sensor 222 may be processed prior to use by controller 118 to convert the signals to a different voltage, to remove interference from the circuits, to amplify the signals, or other similar forms of digital signal processing. In some embodiments, the signals of suction pressure sensor 222 may be transmitted to controller 118 directly or indirectly, such as through one or more intermediary devices.

Tandem compressor 102 may, in various embodiments, include a plurality of compressors, for example, compressors 204A-B, operating in parallel to receive and compress refrigerant such that HVAC may heat or cool a structure associated with HVAC system 100. Compressors 204A-B may both be part of a single circuit of components configured for vapor compression cycle operation. Compressors 204A-B may be turned on and off by controller 118 in order to satisfy a temperature demand of conditioned zone 122. In some embodiments, compressors 204A-B may comprise crankcase heaters 226A-B and sump temperature sensors 220A-B, respectively.

Crankcase heaters 226A-B may, in various embodiments, be an electric heater band at the bottom of compressors 204A-B. For example, crankcase heaters 226A-B may be crankcase heaters, which heat the oil in the sumps of compressors 204A-B, making the oil less viscous. In some embodiments, compressor 204A comprises crankcase heater 226A and compressor 204B comprises crankcase heater 226B. To preserve energy, in some embodiments, crankcase heaters 226A-B may only be turned on when necessary, for example to ensure that the oil in the sumps maintains a certain viscosity.

Sump temperature sensors 220A-B comprise sensors to measure the temperature at the sump of compressors 204A-B. In some embodiments, sump temperature sensors 220A-B may be thermistors, thermocouples, resistive temperature devices, infrared sensors, or thermometers. In some embodiments, sump temperature sensors 220A-B may be configured to transmit one or more signals to controller 118 indicating the respective temperature data sensed by sump temperature sensors 220A-B. In some embodiments, compressor 204A may comprise sump temperature sensor 220A and compressor 204B may comprise sump temperature sensor 220B.

Controller 118 may be connected to HVAC system 100 components via wired or wireless connections and may, in various embodiments, comprise any suitable system, device, or apparatus for controlling, monitoring, protecting, and/or configuring HVAC system 100 components. Controller 118 may be implemented with control logic for selectively turning on or turning off one or more HVAC system 100 components in response to demands on HVAC system 100, user input, and data received from sensors. In some embodiments, controller 118 may perform a change of state by sending a signal instructing an HVAC system 100 component to turn on, turn off, or change its current configuration (e.g., increase or decrease a blower speed).

In some embodiments, controller 118 may be provided with one or more internal components configured to perform one or more of the functions of a memory, a processor, and/or an input/output (I/O) interface. Controller 118 memory may store computer executable instructions, operational parameters for system components, calibration equations, predefined tolerance values, or ranges, for HVAC system 100 operational conditions, and the like. Controller 118 processor may execute instructions stored within Controller 118 memory. Controller 118 I/O interface may operably connect controller 118 to HVAC system 100 components such as compressors 204A-B, crankcase heaters 226A-B, outdoor temperature sensor 124, suction pressure sensor 222, sump temperature sensors 220A-B, as well as other components that may be provided.

In some embodiments, controller 118 may be configured to provide status information indicating HVAC system 100 components operation and performance. Controller 118 may comprise a display screen, one or more LEDs, a speaker, or some other similar device capable of indicating status information to a user of the HVAC system 100. Additionally, controller 118 may be configured to transmit status information to one or more devices or systems remote to the HVAC system 100.

Controller 118 may, in some embodiments, be implemented with logic for monitoring and/or reconfiguring operation of HVAC system 100 components. Controller 118 may receive data from one or more remote devices, such as sump temperature sensors 220A-B, outdoor temperature sensor 124, and suction pressure sensor 222. Controller 118 may receive data from one or more remote devices indicating status information. For example, controller 118 may receive status information indicating whether compressors 204A-B are turned on or turned off. The data received by controller 118 may comprise signals from one or more remote devices. Controller 118 may receive one or more signals directly from one or more remote devices. Controller 118 may receive one or more signals indirectly from one or more remote devices, such as through one or more intermediate devices. The one or more intermediate devices may comprise signal converters, processors, input/output interfaces, amplifiers, conditioning circuits, connectors, and the like.

Controller 118 may, in some embodiments, comprise threshold logic 118A, which may be instructions to cause controller to stop the operation of compressor 102 or turn off one or both compressors 204A-B if they are operating outside of a threshold range. Controller 118 may determine the compressor sump super heat (CSSH) of compressors 204A-B in order to determine whether compressors 204A-B may safely operate (e.g., operate without failing and/or causing damage to compressors 204A-B). CSSH may be the difference between the sump temperature of compressors 204A-B and the saturated suction temperature of compressors 204A-B, which may be determined from data at suction pressure sensor 222. Controller 118 may calculate the CSSH based on measurements from sump temperature sensors 220A-B, outdoor temperature sensor 124, and suction pressure sensor 222. Each of these measurements is required to calculate the CSSH of compressors 204A-B. In some embodiments, a CSSH which is too high or too low may damage the compressor. In some embodiments, controller 118 initiates crankcase heaters 226A-B of compressors 204A-B if it determines compressors 204A-B are on and have a low CSSH value.

When threshold logic 118A is enabled, controller 118 may turn off tandem compressor 102 in response to the determination that tandem compressor 102 (or one of compressors 204A-B) is operating outside of a threshold CSSH threshold range. For example, controller 118 may compare the calculated CSSH value to a threshold range and if the CSSH value is outside the threshold range, it will turn off the compressor and prevent it from operating. When threshold logic 118A is disabled, controller 118 would not turn off tandem compressor 102 (or one of compressors 204A-B) in response to the determination that it is operating outside of the CSSH threshold range.

In some embodiments, controller 118 may determine whether one of the components of HVAC system 100 has failed. For example, controller 118 may determine that one or more of sump temperature sensors 220A-B, outdoor temperature sensor 124, and suction pressure sensor 222 has failed. In some embodiments, failure of one or more of the sensors may result from an interruption of power, a disconnected wire, a technical error, a coding error, or any other event that results in controller 118 being unable to receive a measurement value from the sensor. If controller 118 does not receive each of the measurements from temperature sensors 220A-B, outdoor temperature sensor 124, and suction pressure sensor 222, it is unable to accurately calculate the CSSH of compressors 204A-B.

In some embodiments, controller 118 may initiate crankcase heaters 226A-B in both compressor 204A and compressor 204B in response to determining that one of the sensors has failed. Initiating crankcase heaters 226A-B ensures the oil retains a necessary viscosity to avoid damage to compressors 204A-B. Initiating crankcase crankcase heaters 226A-B provides a safe mode of operation when, due to sensor failure, controller 118 cannot accurately calculate the CSSH value of compressors 204A-B to determine when one of compressors 204A-B has a low CSSH and requires crankcase heaters 226A-B to be on.

In some embodiments, controller 118 may transmit an alert indicating that one of the plurality of sensors has failed. For example, the sensor(s) associated with a detected failure condition within the HVAC system 100 may be identified on controller 118 display. Controller 118 may raise a system alert by displaying an alert code on a screen of controller 118. In some embodiments, controller 118 is connected to a central energy or building management system, and controller 118 may also transmit an alert code to that system. Controller 118 may continue to operate HVAC system 100 during the alert, including providing heating or cooling to a conditioned space using the HVAC system 100 components that have not failed.

In some embodiments, controller 118 determines a temperature demand of a structure associated with HVAC system 100. Controller 118 may receive data from indoor temperature sensor 126 in structure 120 in order to determine the temperature demand. For example, based on received data, controller 118 may determine structure 120 requires heating or cooling. In some embodiments, there may be possible levels of demand indicated by, for example, "O," "Y1," and "Y2." An O demand may signify structure 120 does not require heating or cooling. A Y1 demand may signify the building requires a first stage of heating or cooling. A Y2 demand may signify the building requires a second stage of heating or cooling. HVAC system 100 may include any number of levels of demand to indicate the necessary heating or cooling of structure 120.

In some embodiments, controller 118 may determine a required load operation of tandem compressor 102 based on the temperature demand. In some embodiments, controller 118 may use the temperature demand to determine whether tandem compressor 102 is completely off (e.g., compressors 204A-B are both off) or tandem compressor 102 is completely on (e.g., compressors 204A-B are both on). For example, controller 118 may respond to an O demand by causing tandem operator 102 to not operate at all. Continuing the example, controller 118 may respond to either a Y1 or Y2 demand (or any demand at all) by causing tandem operator 102 to be on, including turning on one or more compressors 204A-B. In some embodiments, controller 118 may use temperature demand to determine how may compressors 204A-B of tandem compressor 102 are on. For example, controller 118 may respond to an O demand by causing compressors 204A-B to not operate at all. Continuing the example, controller 118 may respond to a Y1 demand by causing tandem compressor 102 to perform part load operation (e.g., compressor 204A is on while compressor 204B is off, or compressor 204B is one while compressor 204A is off). Further, controller 118 may respond to a Y2 demand by causing tandem compressor 102 to perform full load operation (e.g., both compressors 204A-B are turned on).

In some embodiments, controller 118 determines that one or both of compressors 204A-B have been on for a maximum run time and, in response, turns off compressors 204A-B. Maximum run time may be a set amount of time based on previous testing of HVAC system 100. For example, maximum run time may be between one and three hours. In some embodiments, maximum run time may be determined by controller 118 based on data received from outdoor temperature sensor 124. After one or both of compressors 204A-B have been on for a maximum run time, controller 118 turns off compressors 204A-B to ensure compressors 204A-B operate safely and avoid damage or failure.

In some embodiments, controller 118 may turn compressors 204A-B off for a minimum off time. Minimum off time may be a predetermined amount of time, for example, based on previous testing of HVAC system 100. For example, minimum off time may be between one and five minutes. Controller 118 ensures compressors 204A-B remain off for the minimum off time to ensure that lubrication oil in compressors 204A-B are able to redistribute after migrating as a result of compressors 204A-B being on. The minimum off time may prevent damage or failure to compressors 204A-B by ensuring the lubrication oil is evenly distributed. After compressors 204A-B are off for a minimum off time, controller 118 may turn on one or both compressors 204A-B.

In some embodiments, controller 118 may have an order in which to turn on compressors 204A-B. For example, in satisfying a partial temperature demand, only one compressor 204A may need to be turned on at once. Controller 118 may determine which compressor to turn on first based on the total run time of compressors 204A-B. Controller 118 may determine the total time that compressors 204A-B have been running since tandem operator 102 has been in operation of HVAC system 210. For example, compressor 204A may have a total run time of 1500 hours and compressor 204B may have a total run time of 1343 hours. Continuing the example, controller 118 may determine to operate compressor 204B first because of its lower total run time. This may be beneficial because it would even out the run time and use of compressors 204A-B. For example, in satisfying a partial load demand, only one compressor needs to be on at once. If controller 118 determines to turn on compressor 204B first and the temperature demand is satisfied before the maximum run time of compressor 204B, then controller 118 may turn off compressor 204B. In this way, compressor 204B has increased its total run time while compressor 204A has maintained its total run time, thus allowing their total run times to become more even. This may allow compressors 204A-B to be used more evenly and reduce the likelihood of one compressor (e.g., 204A) failing or being damaged before another compressor (204B) due to uneven use.

In some embodiments, controller 118 may determine the operation status of compressors 204A-B. Controller 118 may determine whether compressors 204A-B are currently on or off. In some embodiments, before sending a signal that one of compressors 204A-B needs to be turned on or off, controller 118 may first determine whether compressors 204A-B are already on or off. For example, controller 118 may determine that there is no required load demand in structure 120 associated with HVAC system 100. Because there is no required load demand, controller 118 may send a signal that compressors 204A-B be turned off. However, before sending the signal to turn off compressors 204A-B, controller 118 may first determine whether compressors 204A-B are on or not. For example, if compressors 204A-B are both off, controller 118 does not need to send signals to turn off compressors 204A-B. As another example, if compressor 204A is off and compressor 204B is on, controller 118 may determine that it only needs to send a signal to compressor 204B to turn it off. As another example, if controller 118 determines there is a full required load demand based on off the temperature demand, it may determine whether compressors 204A-B are already on before sending signals to turn them both on.

In some embodiments, controller 118 determines a required speed of indoor blower 112 based at least in part upon a temperature demand of conditioned zone 122. Controller 118 may receive temperature data from indoor temperature sensor 126 and determine that conditioned zone 122 requires, for example, heating or cooling. In order to provide the heating or cooling, controller 118 may determine that indoor blower 112 may need to increase or decrease its speed. In some embodiments, controller 118 will send signals to indoor blower 112 in order to change the current speed of indoor blower 118 to the required speed determined based on the temperature demand of conditioned zone 122.

In some embodiments, controller 118 determines that HVAC system 100 requires a change of state. A change of state includes a change in the settings of one or more components (e.g., compressor 102, indoor blower 112) that causes a CSSH outside a threshold range, but where compressor 102 can safely operate (e.g., without damage or failure). In some embodiments, compressor 102 may change load operations, which is a change of state. For example, compressor 102 may be operating at a partial load (e.g., compressor 204A is on and compressor 204B is off) and change to a full load (e.g., both compressors 204A-B are on) or a zero load (both compressors 204A-B are off). As another example, compressor 102 may be operating at a full load and change to a zero load or a partial load. As an additional example, compressor 102 may be operating at a zero load and change to a partial load or a full load.

Any change in the load operation causes controller 118 to determine that HVAC system 100 requires a change of state. In some embodiments, controller 118 may change the speed of indoor blower 112 by more than a speed threshold, which is an example of a change of state in HVAC system 100. The speed threshold may be a specific speed value, a difference between a current speed and a required speed, a percentage of the difference (e.g., change) in speed, or any other value related to the current and required speed. For example, indoor blower 112 may change its speed by approximately 10% (e.g., between 8 and 12 percent). When HVAC system 100 changes its state, controller 118 may calculate a CSSH value that is outside a threshold range. When the CSSH value of a compressor (e.g., compressor 204A or 204B) is outside the threshold range, threshold logic 118A requires that the compressor be turned off to prevent any damage to the compressor. During a change of state of HVAC system 100, in some embodiments, a compressor may be able to operate without risk of damage even if the CSSH value of one or both compressors 204A-B is outside the threshold range.

In some embodiments, controller 118 determines HVAC system 100 has implemented the change of state. Controller 118 may determine the current speed of indoor blower 112 or determine operation status of compressors 204A-B in order to determine that HVAC system 100 has implemented the change of state. For example, if the change of state is indoor blower 112 changing speeds above a threshold amount, controller 118 may determine that indoor blower 112 has successfully changed speeds and reached its required speed. After determining indoor blower 112 reached its required speed, controller 118 determines HVAC system 100 has implemented the change of state. As another example, if the change of state is switching compressor 102 from partial load operation to full load operation, controller 118 can determine the current operation status of compressors 204A-B. If both compressors 204A-B are on (e.g., compressor 102 is in full load operation), controller 118 may determine HVAC system 100 has implemented the change of state. In response to determining that HVAC system 100 has implemented the change of state, controller 118, in some embodiments, enables threshold logic 118A so that CSSH values of compressors 204A-B determine whether they may operate safely and without damaging compressors 204A-B.

In some embodiments, controller 118 operates compressors 204A-B in safe mode in response to determining one of the components of HVAC system 100 has failed. Because controller 118 cannot rely on logic 118A and the CSSH value of compressors 204A-B, it relies on a safe mode of operation. Safe mode may be a mode of operating compressors 204A-B and crankcase heaters 226A-B without relying on a CSSH value of compressors 204A-B that protects compressors 204A-B from damage and/or failure. For example, in safe mode controller 118 may command both crankcase heaters 226A-B to be turned on at all times. As another example, in safe mode, controller 118 may have a sequence of turning compressors 204A-B on and off based on a temperature demand of a thermostat.

Controller 118, in some embodiments, disables threshold logic 118A. Controller 118 may disable threshold logic, for example, by not calculating CSSH value, not comparing the CSSH value to a threshold, or ignoring a request from threshold logic 118A to turn off one or both compressors 204A-B. In some embodiments, controller 118 disables threshold logic 118A in response to determining that one of the sensors has failed and that compressors 204A-B should operate in safe mode. For example, if controller 118 determines suction pressure sensor 222 no longer provides data to controller 118, then it may disable threshold logic 118 that calculates CSSH of compressors 204A-B and changes the operation of compressors 204A-B based on the CSSH value. If controller 118 does not disable threshold logic 118A, the CSSH value would be inaccurate from the faulty readings of the failed sensor(s). Thus, it is beneficial to disable threshold logic 118A so that controller 118 may determine when to operate components of HVAC system 100 based on factors other than CSSH value.

In some embodiments, controller 118 may disable threshold logic 118A in response to determining that HVAC system 100 requires a change of state (e.g., change in load operation of tandem compressor 102, change in speed of indoor blower 112 above threshold). During a change of state of HVAC system 100, in some embodiments, a compressor may be able to operate without risk of damage even if the CSSH value of one or both compressors 204A-B is outside the threshold range. In some embodiments, in response to determining there is a change of state of HVAC system 100, controller 118 may disable threshold logic 118A. In some embodiments, controller 118 may disable threshold logic 118A for a certain pre-determined period of time. For example, controller 118 may keep threshold logic 118A disabled for a range of 10 to 30 minutes. When threshold logic 118A is disabled, controller 118 may perform the change of state (e.g., changing the speed of the blower, turning compressors 204A-B on and off in response to the temperature demand of the structure) independently of the threshold logic. For example, the threshold logic does not prevent controller 118 from performing the change of state of HVAC system 100.

In some embodiments, controller 118 may enable threshold logic 118A. In some embodiments, controller 118 enables threshold logic 118A in response to HVAC system 100 completing its change of state. If the change of state involved indoor blower 112 changing its speed, controller 118 may enable threshold logic 118A after indoor blower 112 reaches its required speed. If the change of state involved compressor 102 changing its load operation, controller 118 may enable threshold logic 118A in response to compressor 102 successfully changing its load operation. For example, if compressor 102 is operating at a partial load and changes to a full load, controller 118 may enable threshold logic 118A after both compressors are on and operating. In some embodiments, controller 118 may enable threshold logic 118A after a certain period of time. For example, controller 118 may wait a period of 10 to 30 minutes while threshold logic 118A is disabled before enabling threshold logic 118A again.

Modifications, additions, or omissions may be made to the systems described herein without departing from the scope of the disclosure. For example, HVAC system 100 may include any number of controllers 118, outdoor temperature sensor 124, suction lines 106, discharge lines 108, and tandem compressors 102. As another example, tandem compressor 102 may include any number of compressors 204A-B. The components may be integrated or separated. Moreover, the operations may be performed by more, fewer, or other components. Additionally, the operations may be performed using any suitable logic comprising software, hardware, and/or other logic.

Figure 3:
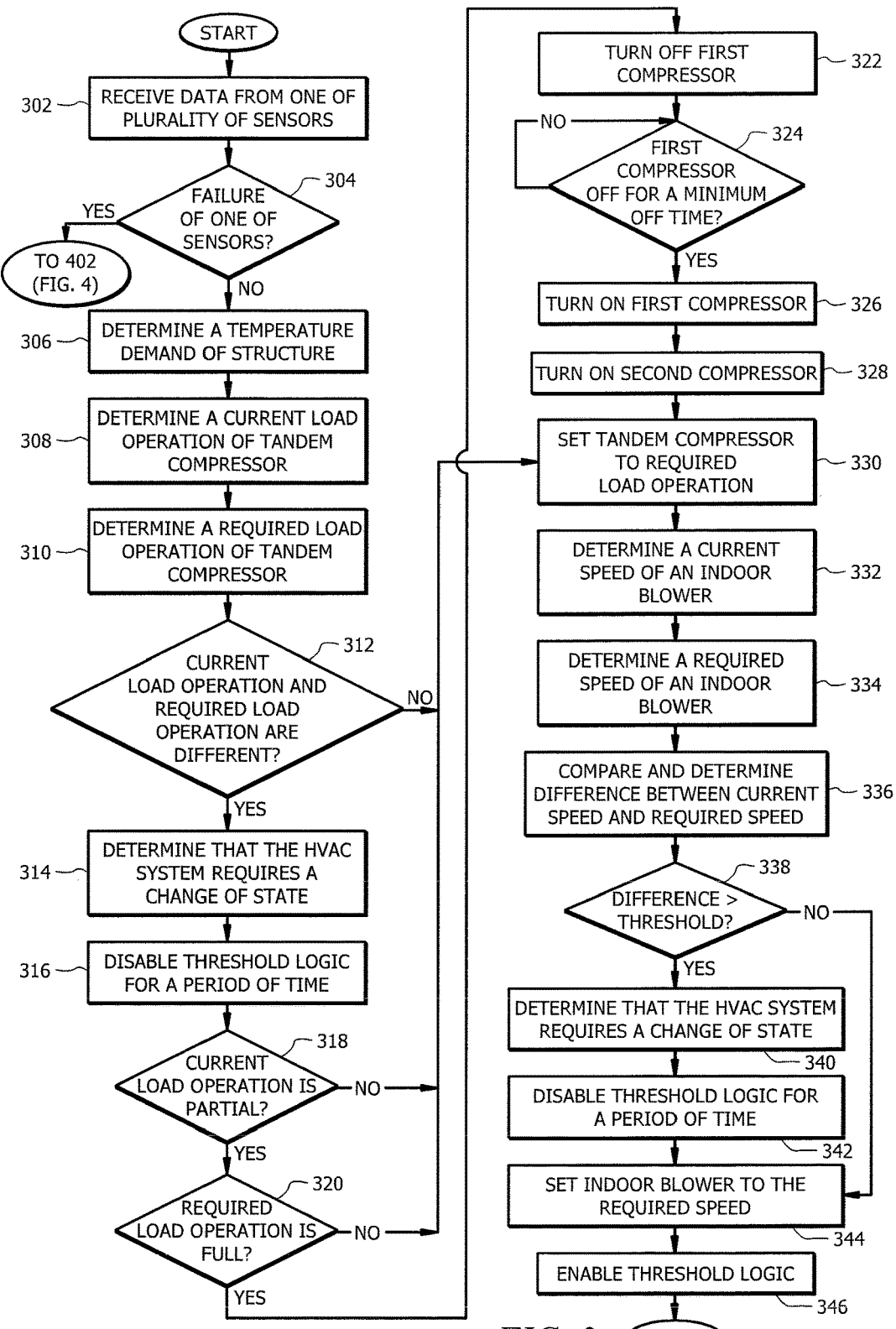
FIG. 3 illustrates a flowchart describing an example of accommodating a change of state in an example HVAC system.

FIG. 3 illustrates a flowchart describing an example of accommodating a change of state in an example HVAC system. To illustrate examples of handling sensor error failures, the steps of FIG. 3, described below, discuss components of FIG. 1 and FIG. 2, although other components not illustrated in FIG. 1 and FIG. 2 may be used. Controller 118 may perform this method as a way to allow HVAC system 100 to make a change in state without threshold logic 118A requiring compressors 204A-B be turned off.

At step 302, in some embodiments, controller 118 receives data from at least one of a plurality of sensors. Controller 118 may receive data from outdoor temperature sensor 124, indoor temperature sensor 126, sump temperature sensors 220A-B, suction pressure sensor 222, or any other sensor in HVAC system 100.

At step 304, in some embodiments, controller 118 determines that a sensor has failed. For example, controller 118 may determine that one or more of sump temperature sensors 220A-B, outdoor temperature sensor 124, and suction pressure sensor 222 has failed. In some embodiments, failure of one or more of the sensors may result from an interruption of power, a disconnected wire, a technical error, a coding error, or any other event that results in controller 118 being unable to receive a measurement value from the sensor. For example, controller 118 may stop receiving data from sump temperature sensor 220A, which indicates a failure. In response to determining that a sensor of HVAC system 100 has failed at step 304, the method continues to step 402, in some embodiments. If at step 304, controller 118 determines that there has not been a failure of one of the sensors, the method continues to step 306.

At step 306, in some embodiments, controller 118 determines a temperature demand of conditioned zone 122 of structure 120 associated with HVAC system 100. Controller 118 may receive data from indoor temperature sensor 126 in structure 120 in order to determine the temperature demand. Based on received data, controller 118 may determine structure 120 requires heating or cooling. For example, if the temperature set-point is 76 degrees Fahrenheit, and controller 118 determines based on the data from indoor temperature sensor 126 that the temperature of conditioned zone 122 is 80 degrees Fahrenheit, controller 118 may further determine conditioned zone 122 requires cooling. In some embodiments, controller 118 determines whether there is no temperature demand, a partial demand, or a full demand. For example, if the temperature set-point is 78 degrees Fahrenheit and controller 118 determines that the temperature of conditioned zone 122 is 63 degrees Fahrenheit, controller 118 may determine this is a full temperature demand. As another example, if the temperature set-point is 74 degrees Fahrenheit and controller 118 determines that the temperature of conditioned zone 122 is 76 degrees Fahrenheit, controller 118 may determine this is a partial temperature demand.

In some embodiments, at step 308, controller 118 may determine a current load operation of compressor 102. Controller 118 may determine the operation status of each compressor within tandem compressor 102 to determine the current load operation. For example, if compressors 204A-B are both off, controller 118 may determine the current load operation of compressor 102 is no load operation (e.g., zero load operation (O state)). As another example, if both compressors 204A-B are on, controller 118 may determine the current load operation of compressor 102 is a full load operation (e.g., Y2 state). As another example, if compressor 204A is on and compressor 204B is off (or compressor 204A is off and 204B is on), controller 118 may determine the current load operation of compressor 102 is a partial load operation (e.g., Y1 state).

At step 310, in some embodiments, controller 118 determines a required load operation of tandem compressor 102 based on the temperature demand determined at step 306. For example controller 118 may determine there is no required load operation, a partial required load operation, or a full required load operation.

At step 312, in some embodiments, controller 118 determines whether the current load operation of compressor 102 and the required load operation of compressor 102 are different. Controller 118 may compare the current load operation determined in step 308 and the required load operation in step 310. For example, if the current load operation is no load operation (e.g., zero load operation) and the required load operation is partial load operation or full load operation, controller 118 determines these are different. As another example, if the current load operation is partial load operation and the required load operation is partial load operation, controller 118 determines the current load operation and required load operation are not different. If controller 118 determines the current load operation and required load operation are not different, it continues to step 330 and sets tandem compressor 102 to the required load operation by making no change to settings of compressors 204A-B. If controller 118 determines the current load operation and required load operation are different, it continues to step 314 and, in some embodiments, determines that HVAC system 100 requires a change of state.

At step 316, in some embodiments, controller 118 disables threshold logic 118A in response to determining that the current load operation and required load operation are different in step 312 and that HVAC system 100 requires a change of state in step 314. By disabling threshold logic 118A, controller 118 may change the load operation of compressor 102 without threshold logic 118A requesting to turn off compressors 204A-B. For example, if the required load operation determined at step 310 is partial load operation, controller 118 may implement the required load operation (e.g., partial load) by turning on compressor 204A and turning off compressor 204B.

In some embodiments, controller 118 performs steps 318-328 in order to further protect compressors 204A-B from any damage. When controller 118 changes tandem compressor 102 from a partial load operation to a full load operation and/or when threshold logic 118A has been disabled, controller 118 may engage in a specific sequence to ensure there is an oil balance between compressors 204A-B before starting both compressors.

At step 318, in some embodiments, controller 118 determines whether the current load operation of compressor 102 is a partial load operation. Controller 118 may use the current load operation determined at step 308. If controller 118 determines the current load operation of compressor 102 is not a partial load operation (e.g., full load operation or zero load operation), the method continues to step 330 where controller 118 sets tandem compressor to required load operation. If controller 118 determines the current load operation of compressor 102 is a partial load operation, the method continues to step 320. At step 320, in some embodiments, controller 118 determines whether the required load operation is full load operation. Controller 118 may use the required load operation determined at step 310. If controller 118 determines the required load operation is not full load operation (e.g., zero load operation or partial load operation), the method continues to step 330 where controller 118 sets compressor 102 to the required load operation. If controller 118 determines the required load operation is full load operation, controller 118 continues to step 322.

At steps 318 and 320, controller 118 may determine that compressor 102 is changing from a partial load operation (e.g., compressor 204A is on and compressor 204B is off) to a full load operation (e.g., both compressors 204A-B are on). When compressor 102 was at a partial load operation, the oil lubricant of compressors 204A-B may have migrated such that it is not distributed approximately evenly between the two. If one of compressors 204A-B operates with an insufficient amount of oil lubricant, that may cause damage to the compressor with insufficient oil. Thus, controller determines a specific sequence of changing the load operation of compressor 102 from partial load operation to full load operation to reduce the probability of damage to compressor 102.

If controller 118 determines the current load operation of compressor 102 is partial load operation at step 318 and the required load operation is full load operation at step 320, controller 118 turns off compressor 204A at step 322. Controller 118 determines, at step 324, whether compressor 204A has been off for the minimum off time. The minimum off time may be, for example, sixty seconds. In some embodiments, controller 118 allows compressors 204A-B to remain off for the minimum off time to ensure that the lubrication oil in compressors 204A-B are able to redistribute after migrating while only one compressor was on. The minimum off time may prevent damage or failure to compressors 204A-B by ensuring the lubrication oil is evenly distributed before turning on both compressors 204A-B. After compressors 204A-B are off for a minimum off time, controller 118 may turn on compressor 204A at step 326 and compressor 204B at step 328. In some embodiments, controller 118 may wait a period of time before turning on compressor 204B at step 328 to avoid both compressors 204A-B being turned on simultaneously, which may cause a large power demand on an electrical distribution grid. The period of time of the pause may be, for example, two to five seconds.

At step 330, in some embodiments, controller 118 sets compressor 102 to the required load operation. Controller 118 may perform this step when controller 118 determined either at step 318 that the current load operation is not partial load operation or the required load operation is not a full load operation. For example if controller 118 determined at steps 308 and 310 that compressor 102 was changing from a full load operation to a partial load operation, controller 118 may turn off compressor 204A at step 330. As another example, if controller 118 determined at steps 308 and 310 that compressor 102 was changing from a zero load operation to a full load operation, controller 118 may turn on both compressors 204A-B at step 330.

At step 332, in some embodiments, controller 118 determines a current speed of indoor blower 112. In some embodiments, at step 334 controller 118 determines a required speed of indoor blower 112 based at least in part upon the temperature demand determined at step 306. For example, if controller 118 determines at step 306 that conditioned zone 122 requires a full load temperature demand, at step 334 controller 118 may determine the speed of indoor blower 112 needs to be increased. At step 336, controller 118, in some embodiments, may compare the speeds (e.g., in RPM or CFM) and determine a difference between the two values. At step 338, in some embodiments, controller 118 determines whether the difference between the current speed and the required speed is above a threshold. If controller determines the difference is not above a threshold at step 338, controller sets indoor blower 112 to the required speed at step 344. If controller determines that the difference between the current speed and the required speed is above a speed threshold at step 338, controller determines that HVAC system 100 requires a change of state at step 340. In response to determining that HVAC system 100 requires a change of state at step 340, controller 118 may disable threshold logic at step 342. In some embodiments, controller 118 may disable threshold logic for a period of time, for example, 30 minutes or until indoor blower 112 reaches the required speed. In some embodiments, steps 340-342 can be performed using one or more of the techniques discussed above with respect to steps 314-316.

While threshold logic 118A is disabled, in some embodiments, at step 344 controller 118 may set indoor blower 112 to the required speed determined at step 334. Controller 118 may send a signal to indoor blower 112 setting it to the required speed. At step 346, in some embodiments, controller 118 enables threshold logic 118A. After HVAC system has implemented the change of state (e.g., as determined at step 314 and/or step 340), the CSSH value becomes helpful in determining whether compressors 204A-B may operate safely and without damage, and thus controller 118 relies on threshold logic 118A to turn off compressors 204A-B when their CSSH value falls outside the safe threshold. After enabling threshold logic 118A, the method ends.

Modifications, additions, or omissions may be made to the methods described in FIG. 3 without departing from the scope of the disclosure. For example, the steps may be combined, modified, or deleted where appropriate, and additional steps may be added. For example, if controller 118 determines the status of compressor 204A is off, then step 322 may be omitted. Additionally, the steps may be performed in any suitable order without departing from the scope of the present disclosure. While discussed as controller 118 performing the steps, any suitable component of HVAC system 100 may perform one or more of the steps.

Figure 4:
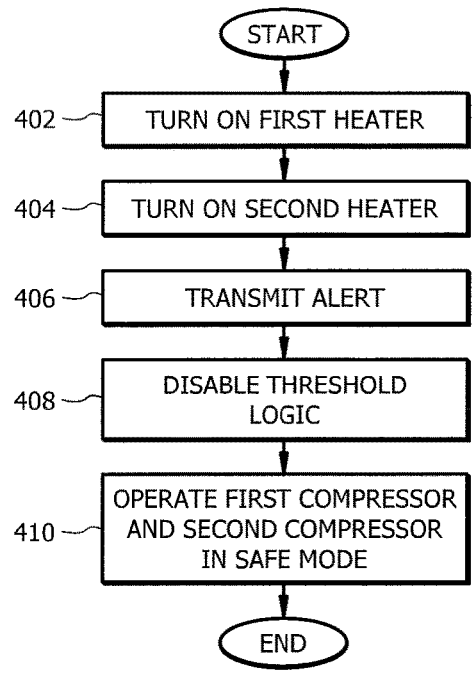
FIG. 4 illustrates a flowchart describing an example of handling sensor failure errors.

FIG. 4 illustrates a flowchart describing an example of handling sensor failure errors. To illustrate examples of handling sensor error failures, the steps of FIG. 4, described below, discuss components of FIG. 1 and FIG. 2, although other components not illustrated in FIG. 1 and FIG. 2 may be used. Controller 118 may perform this method as a "safe mode" operation of tandem compressor 102. Although this mode of operation requires more energy, it allows HVAC system 100 to continue operating safely (e.g., without damage or failure of tandem compressor 102) after one or more sensors have failed.

At steps 402 and 404, in some embodiments, controller 118 turns on crankcase heaters 226A-B (e.g., crankcase heaters). Controller 118 may perform steps 402 and 404 in response to determining at step 302, described above in FIG. 3, that one or more of the plurality of sensors have failed. In some embodiments, crankcase heaters 226A-B are applied to the oil in the sumps of compressors 204A-B, making the oil less viscous. This protects compressors 204A-B from damage or failure. In some embodiments, crankcase heaters 226A-B may remain on until the failed sensor is repaired and properly functioning. For example, while controller 118 does not receive data from sump temperature sensor 220A, crankcase heaters 226A-B may remain on.

At step 406, in some embodiments, controller 118 transmits an alert regarding the failed sensor. Controller 118 may display an alert that sump temperature sensor 220A failed on controller 118 display. In some embodiments, controller 118 is connected to a central energy or building management system, and controller 118 may also transmit an alert code to that system. This may alert an operator of HVAC system 100 to the problem and cause the operator to initiate maintenance on the failed sensor(s).

At step 408, in some embodiments, controller 118 disables logic threshold 118A. Logic 118A may rely on CSSH of compressors 204A-B to determine operation of HVAC system 100. In some embodiments, threshold logic 118A requires measurements from one or more sensors of HVAC system 100, for example, sump temperature sensors 220A-B, outdoor temperature sensor 124, and suction pressure sensor 222. Each of these measurements is required to calculate the CSSH of compressors 204A-B. When one of these sensors has failed, controller 118 cannot accurately determine the CSSH of compressors 204A-B, and thus logic 118A cannot properly function. In order to continue operating HVAC system 100 despite failure of one or more sensors, controller 118 disables logic 118A and operates compressors 204A-B in safe mode, at step 410 in some embodiments. Examples of safe mode operation are described with respect to FIGS. 5-6.

Figure 5:
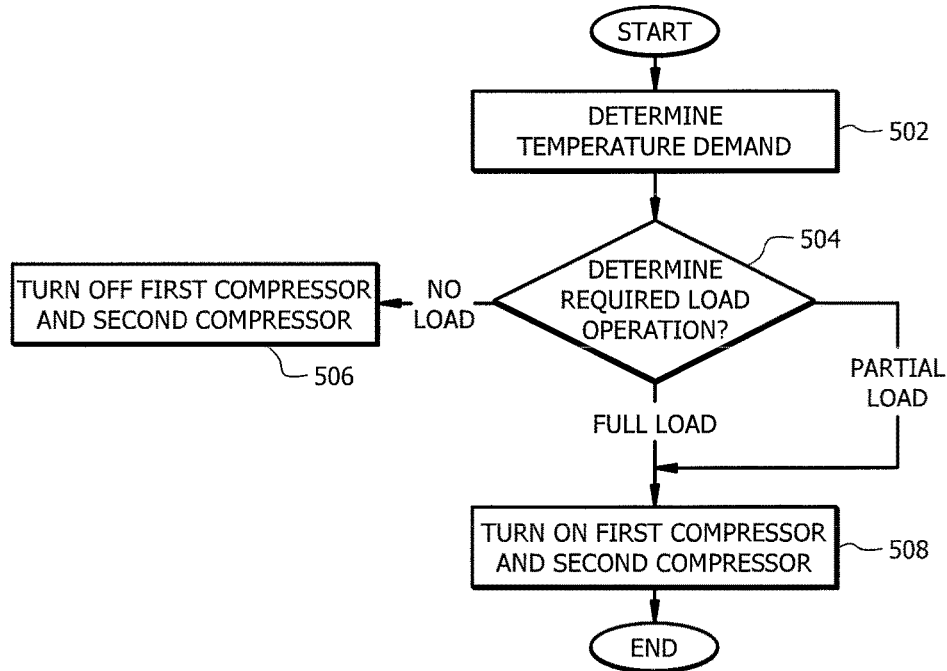
FIG. 5 illustrates an example of a safe mode operation.

FIG. 5 illustrates an example of a safe mode operation that may be initiated at step 410 of FIG. 4. At step 502, in some embodiments, controller 118 determines a temperature demand of conditioned zone 122 of structure 120 associated with HVAC system 100. Controller 118 may receive data from indoor temperature sensor 126 in structure 120 in order to determine the temperature demand. For example, based on received data, controller 118 may determine that structure 120 requires heating or cooling. In some embodiments, controller 118 determines whether there is no temperature demand, a partial demand, or a full demand. In some embodiments, step 502 can be performed using one or more of the techniques discussed above with respect to steps 306 of FIG. 3.

At step 504, in some embodiments, controller 118 determines a required load operation of tandem compressor 102 based on the temperature demand determined at step 504. For example controller 118 may determine there is no required load operation, a partial required load operation, or a full required load operation.

If at step 504 controller 118 determines that there is no required load operation, controller 118 proceeds to step 506 and turns off tandem compressor 102 (e.g., compressors 204A-B are turned off). In some embodiments, turning tandem compressor 102 off may include determining the state of tandem compressor 102 and maintaining the off state (if tandem compressor 102 is already off) or changing to the off state (if tandem compressor 102 is currently on). The method may then optionally return to step 502 to monitor for changes in temperature demand that may cause the load demand to change from no load to full or partial required load operation.

If at step 504 controller 118 determines that the demand is for partial or full required load operation, controller 118 proceeds to step 508 and turns tandem compressor 102 to full load operation (e.g., compressors 204A-B are turned on). Full required load operation may be safer than partial load operation, for example, because during full required load operation oil tends to be distributed evenly among the compressors. Thus, full required load operation may be used while in safe mode even if the demand is only for partial required load operation.

In some embodiments, turning tandem compressor 102 on may include determining the state of tandem compressor 102 and maintaining the on state (if tandem compressor 102 is already on) or changing to the on state (if one or more compressors 204 of tandem compressor 102 is currently off). In some embodiments, compressors 204A-B may be turned on according to a staggered start procedure to avoid damage. The method may then optionally return to step 502 to monitor for changes in temperature demand that may cause the load demand to change from full or partial required load operation to no load. The method may also monitor the runtime of compressors 204A-B and may turn off compressors 204A-B for a minimum off time if any compressor 204A-B reaches its maximum runtime.

Figure 6:
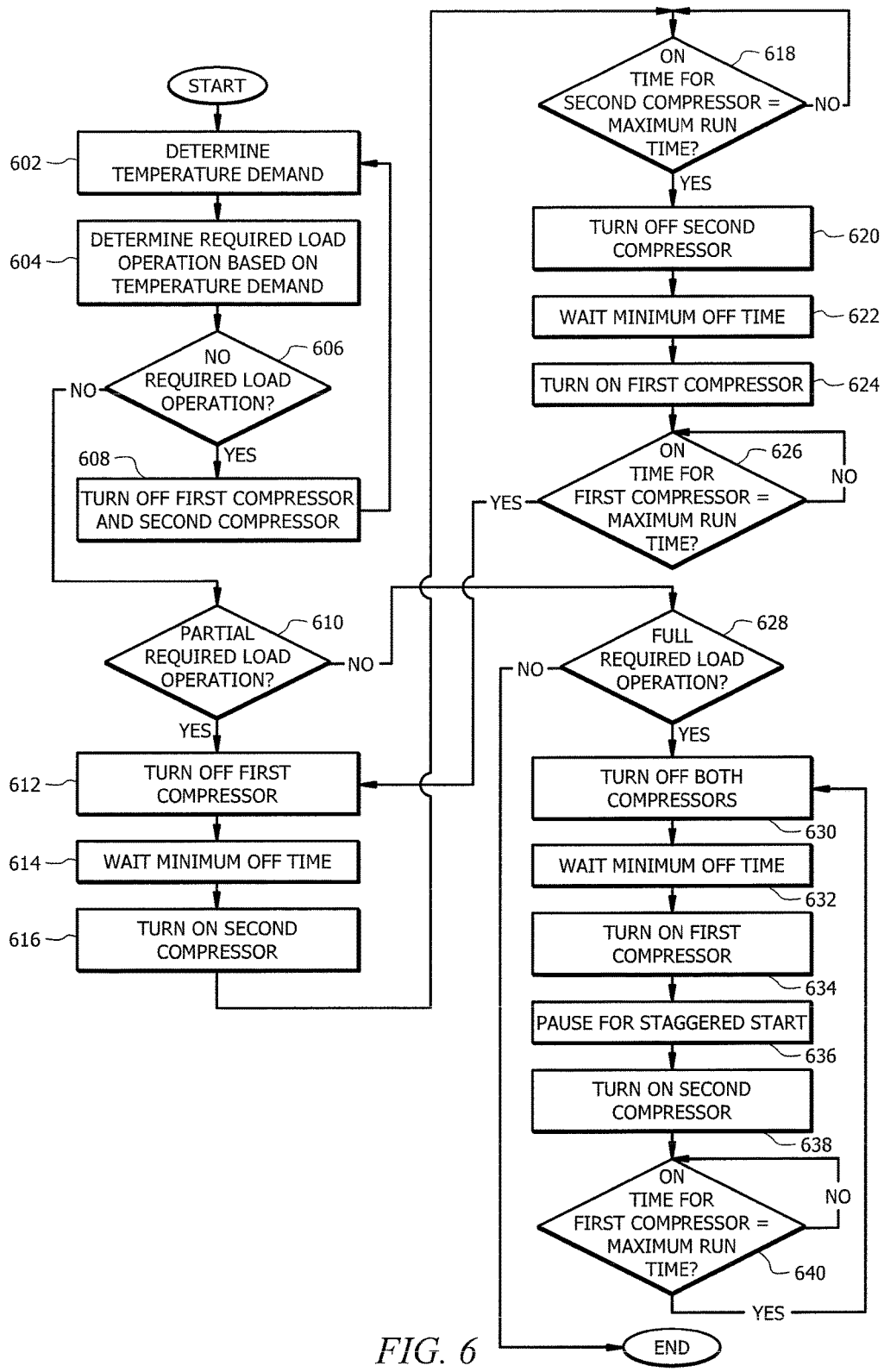
FIG. 6 illustrates another example of a safe mode operation.

FIG. 6 illustrates another example of a safe mode operation that may be initiated at step 410 of FIG. 4.

At step 602, in some embodiments, controller 118 determines a temperature demand of conditioned zone 122 of structure 120 associated with HVAC system 100. Controller 118 may receive data from an indoor temperature sensor 126 in structure 120 in order to determine the temperature demand. For example, based on received data, controller 118 may determine structure 120 requires heating or cooling. In some embodiments, controller 118 determines whether there is no temperature demand, a partial demand, or a full demand. In some embodiments, step 602 of the method illustrated in FIG. 6 can be performed using one or more of the techniques discussed above with respect to steps 306 of FIG. 3.

At step 604, in some embodiments, controller 118 determines a required load operation of tandem compressor 102 based on the temperature demand determined at step 602. For example controller 118 may determine there is no required load operation (e.g., O state), a partial required load operation (e.g., Y1 state), or a full required load operation (e.g., Y2 state). At step 606, in some embodiments, controller 118 determines whether there is no required load operation based on the temperature demand determined in step 604. If there is no required load operation (e.g., there is no temperature demand), controller 118 turns off compressors 204A-B at step 608, in some embodiments. In some embodiments, turning compressors 204A-B off may include determining the state of each compressor and maintaining the off state (if compressor 204 is already off) or changing to the off state (if compressor 204 is currently on). The method may then optionally return to step 602 to monitor for changes in temperature demand that may cause the load demand to change from no load to full or partial required load operation.

If controller 118 determines that there is not a "no required load operation" at step 606 (e.g., if the state is Y1 or Y2, rather than O), controller determines whether there is a partial required load operation at step 610. At step 610, in some embodiments, controller 118 may determine that there is not a partial required load operation based on the temperature demand determined at step 604 and continue to step 628. In some embodiments, controller 118 may determine that there is a partial required load operation of tandem compressors 204A-B based on the temperature demand determined at step 604 and continue to step 612.

At step 612, in some embodiments, in response to determining there is a partial required load operation controller 118 turns off compressor 204A. If at step 610 compressor 204A was already off, step 612 may be skipped. If at step 610 compressors 204A and 204B were both on, step 612 may be performed to change from full to partial load operation. In some embodiments, controller 118 selects which compressor to turn off based on total runtime (e.g., turn off compressor 204A if it has a longer total runtime than compressor 204B). If at step 610 compressor 204A was on and compressor 204B was off, controller 118 may delay turning off compressor 204A until compressor 204A has reached its maximum runtime.

At step 614, if compressor 204B is currently off, controller 118 waits a minimum off time and then turns on compressor 204B at step 616. This allows one compressor 204B to be running to satisfy the temperature demand while the other compressor 204A remains off. During operation, controller 118 may be constantly determining the temperature demand at step 602 to determine whether the required load operation has changed from a partial required load operation to a different required load operation (e.g., none or full).

At step 618, in some embodiments, controller 118 determines whether compressor 204B has been on for a maximum run time. If compressor 204B has not been on for a maximum run time, then compressor 204B remains on. If compressor 204B has been on for a maximum run time, the method continues to step 620. For example, if the maximum run time is a predetermined time of two hours and compressor 204B has been on for two hours, controller 118 continues to step 620 and turns off compressor 204B. After waiting a minimum off time at step 622 in some embodiments, controller 118 turns on compressor 204A at step 624. Once controller determines at step 626 that compressor 204A has been on for a maximum run time, controller goes to step 612 and turns off compressor 204A. In some embodiments, step 626 of the method can be performed using one or more of the techniques discussed above with respect to step 618.

In some embodiments, step 612 through step 626 perform a sequence of running one compressor (e.g., 204A or 204B) at a time in order to satisfy the temperature demand determined at step 602. This allows tandem compressor 102 to satisfy the temperature demand while ensuring that compressors 204A-B are not overworked and are used evenly. In some embodiments, controller 118 may turn off compressor 204B (rather than compressor 204A) at step 612 and turn on compressor 204A (rather than compressor 204B) at step 616 so that compressor 204A operates first in the cycle. Controller 118 may determine to start compressor 204A's operation first based on the total run time of compressors 204A-B. For example, compressor 204B may have a total run time of 100 hours while compressor 204A has a total run time of 50 hours. To ensure compressors 204A-B are used evenly, controller 118 may determine to use compressor 204A first when satisfying a partial load demand.

If controller 118 determines at step 610 that there is not a partial required load operation, then at step 628, in some embodiments, controller 118 determines whether there is a full required load operation based on the temperature demand determined at step 602. If there is not a full load operation, the method ends. If controller 118 determines there is a full required load operation and that compressors 204A-B are not currently operating in full load operation, controller turns off both compressors 204A-B at step 630. Turning off both compressors 204A-B may include determining the state of each compressor and maintaining the off state (if compressor 204 is already off) or changing to the off state (if compressor 204 is currently on). After waiting a minimum off time at step 632, controller 118 turns on compressor 204A at step 634. In some embodiments, controller 118 may pause at step 636 before turning on compressor 204B at step 638. This pause at step 636 prevents compressors 204A-B from starting simultaneously and allows for a staggered start between compressors 204A-B. The period of time of the pause may be, for example, two to five seconds. By preventing simultaneous starting of compressors 204A-B, controller 118 lessens the total power demand imposed on an electrical distribution grid.

At step 640, in some embodiments, controller 118 may determine whether either of compressors 204A-B has been on for the maximum run time. If controller 118 determines that neither compressor 204A nor 204B has been running for the maximum run time, both compressors 204A-B continue operation. If controller 118 determines that either compressor 204A or 204B has been running for the maximum run time, controller 118 returns to step 630 to turn off both compressors. For example, if the maximum run time is three hours, compressor 204A has been on for 2 hours and 50 minutes, and compressor 204B has been on for three hours, controller 118 will turn off both compressors 204A-B. In some embodiments, step 640 of the method can be performed using one or more of the techniques discussed above with respect to step 626.

In some embodiments, controller 118 may constantly be determining any temperature demand of structure 120 associated with HVAC system 100 as shown in step 602. For example, at step 624 compressor 204A may be turned on in order to satisfy the partial required load demand and may remain on because it has not reached the maximum run time at step 626. If controller 118 determines that the temperature demand no longer exists, and thus there is no required load demand, controller 118 may move to step 606 and 608 and turn off both compressors 204A-B even though compressor 204A has not reached its maximum run time. Controller 118 may constantly receive data indicating a temperature demand and thus may return to step 604 at any point during the method to update what required load operation is necessary for structure 120 associated with HVAC system 100.

Modifications, additions, or omissions may be made to the methods described in FIGS. 4-6 without departing from the scope of the disclosure. For example, the steps may be combined, modified, or deleted where appropriate, and additional steps may be added. For example, if controller 118 determines the status of compressor 204A is already off at step 610, then step 612 may be omitted. As another example, if controller 118 determines that both compressors 204A-B have already been off for the minimum off time by the time step 614 is reached, step 614 may be omitted because further off time is not necessary to even out the oil distribution. Additionally, the steps may be performed in any suitable order without departing from the scope of the present disclosure. While discussed as controller 118 performing the steps, any suitable component of HVAC system 100 may perform one or more of the steps.

The invention claimed is:

1. A heating, ventilation, and air-conditioning (HVAC) system comprising:
    a plurality of sensors;
    a tandem compressor comprising a first compressor and a second compressor, the first compressor comprising a first crankcase heater and the second compressor comprising a second crankcase heater;
    a controller configured to:
        calculate the compressor sump superheat value for at least one of the first compressor and the second compressor using data received from at least one of the plurality of sensors;
        enable threshold logic, the threshold logic configured to turn off at least one of the first compressor and the second compressor in response to determining that the compressor sump superheat value is outside a threshold range;
        determine that one of the plurality of sensors has failed;
        in response to determining that one of the plurality of sensors has failed:
            initiate the first crankcase heater;
            initiate the second crankcase heater;
            transmit an alert indicating that one of the plurality of sensors has failed;
            disable the threshold logic such that the first and second compressors are controlled independently of a determination whether the tandem compressor is operating outside of the threshold range of the compressor sump superheat value; and
            operate the first compressor and the second compressor according to a safe mode, wherein first on or off settings of the first compressor and the second compressor are determined based on a first required load operation of the tandem compressor, the first required load operation determined from a first temperature demand of a structure associated with the HVAC system.

2. The system of claim 1, wherein the first required load operation is none, the controller further operable to:
    turn off the first compressor;
    turn off the second compressor;
    determine a second temperature demand of the structure associated with the HVAC system;
    determine a second required load operation of the tandem compressor based on the second temperature demand; and
    turn on at least one of the first compressor and the second compressor in response to determining the second required load operation.

3. The system of claim 1, wherein the first required load operation is a partial load operation, the controller further operable to:
    turn off the first compressor;
    turn on the second compressor;
    determine that the second compressor has been on for a maximum run time;
    in response to determining that the second compressor has been on for a maximum run time, turn off the second compressor;
    determine that both compressors have been off for a minimum off time; and
    turn on the first compressor.

4. The system of claim 3, wherein the maximum run time is based on at least a measurement from an outdoor temperature sensor.

5. The system of claim 1, wherein the first required load operation is a full load operation, the controller further operable to:
    turn off the first compressor;
    turn off the second compressor;

determine that both compressors have been off for a minimum off time;
turn on the first compressor at a first time;
turn on the second compressor at a second time, the second time being after the first time;
determine that the first compressor or the second compressor has been on for a maximum run time; and
in response to determining that the first compressor or the second compressor has been on for a maximum run time, turn off the second compressor and the first compressor.

6. The system of claim 1, wherein the safe mode comprises turning both compressors on when the first required load operation is a partial load operation.

7. The system of claim 1, wherein the plurality of sensors include at least one of the group comprising: a sump temperature sensor, an outdoor temperature sensor, a suction pressure sensor, and a structure temperature sensor.

* * * * *